H. J. WILLEMS.
SPRING FABRIC.
APPLICATION FILED OCT. 28, 1919.
1,339,802.
Patented May 11, 1920.
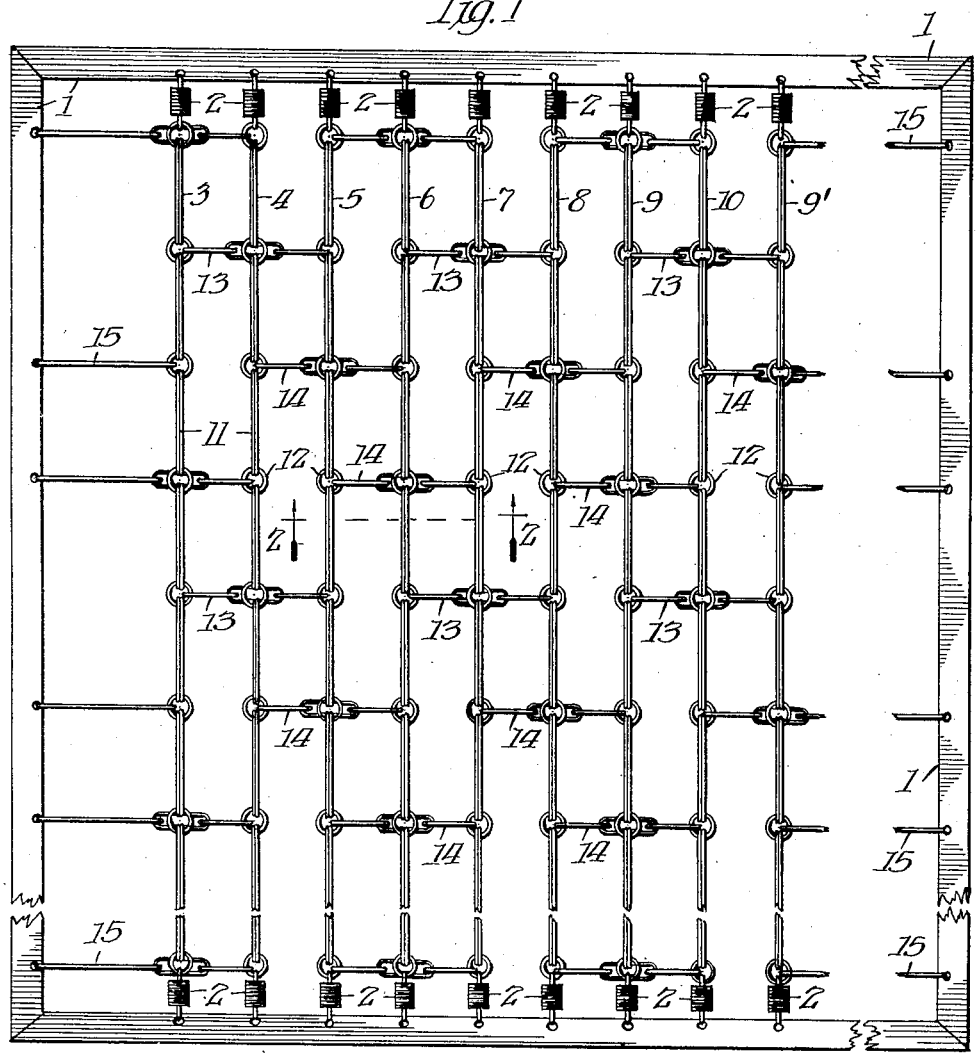
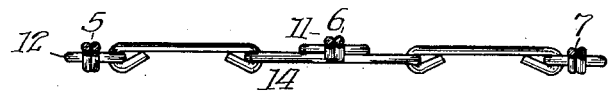
Inventor:
Henry J. Willems,
By G. L. Cragg atty.

UNITED STATES PATENT OFFICE.

HENRY J. WILLEMS, OF KENOSHA, WISCONSIN.

SPRING FABRIC.

1,339,802.  Specification of Letters Patent.  Patented May 11, 1920.

Application filed October 28, 1919. Serial No. 333,927.

*To all whom it may concern:*

Be it known that I, HENRY J. WILLEMS, a citizen of the United States, residing at Kenosha, in the county of Kenosha and State of Wisconsin, have invented a certain new and useful Improvement in Spring Fabrics, of which the following is a full, clear, concise, and exact description.

My invention relates to metal fabrics employed in the manufacture of furniture and of service, for example, in bed structures, davenports, etc., which require metal fabric for supporting mattresses or cushions.

My invention has for its object the provision of a mattress or cushion supporting fabric which will not sag at those portions thereof which are not supporting any load yet which will readily yield at those places where load is being supported so that it may itself constitute a yielding or springlike cushion in suitable supporting relation to the mattress or cushion carried thereby. In carrying out my invention I employ a supporting frame, long members each connected between opposite frame sides, and short members extending crosswise of and connecting long members in pairs that each have a long member intervening between the members thereof and other short members also extending crosswise of the long members and connecting the long member that intervenes between the members of each pair with adjacent long members of adjacent pairs, the aforesaid short members each having an intermediate portion underlying and in supporting relation to one of the aforesaid intervening long members. The long members are in the form of chains. The short members may each be in the form of a chain or a single link as preferred.

I will explain my invention more fully by reference to the accompanying drawings showing several embodiments thereof and in which Figure 1 illustrates a plan view of the preferred formation, parts being broken away for lack of space; and Fig. 2 is a sectional view on line 2—2 of Fig. 1.

Like parts are indicated by similar characters of reference in both figures.

I have illustrated a rectangular or four-sided supporting frame 1. Coiled springs 2 are within the frame adjacent opposite end sides or rails thereof to which the outer ends of these springs are attached at intervals. The long members 3, 4, 5, 6, 7, 8, 9, 10, etc., are connected each between the inner ends of two springs 2 that are connected respectively with the aforesaid opposite frame sides. These long members are in the form of chains comprising long links 11 and short or circular links 12. The long links of said chains are alined in rows that are transverse to said chains, and the short links of said chains are alined in other rows that are also transverse to said chains. Short members 13, each preferably in the form of a three-linked chain, connect the long chains or members 3—5, 6—8, 9—9', etc., in adjacent pairs, each such pair having a long chain or member intervening between the chains thereof. For example, the chains of the pair 3—5 have a long chain 4 intervening therebetween, the long chain or member 7 intervenes between the chains 6—8 of another pair that is adjacent the pair 3—5, etc. Other short chains or members 14, also extending crosswise of the long chains, connect the long chain that intervenes between the chains of each pair (3—5, 6—8, etc.) with adjacent long chains of adjacent pairs. Certain of the chains 14, by way of specific illustration, thus connect intervening long chain 7 with the adjacent long chains 5 and 9 of the pairs (3—5, 9—9') adjacent the pair 6—8 between the chains of which the aforesaid long chain 7 intervenes.

In the preferred embodiment of the invention the short chains or members are connected at their ends with the short links of the long chains and have their mid-portions completely underlying the long chains crossed thereby, whereby the intermediate portions of the short chains have a hammock effect in their supporting relation to the link chains crossing them without in any manner causing the intermediate portions of the short chains and the link chains supported thereby to have binding interaction. This construction produces a very flexible fabric gaining the objects of the invention hitherto specified.

Additional short connecting members 15 may be employed, if desired, to connect one or more outer long chains with adjacent sides of the supporting frame.

While I have herein shown and particularly described the preferred embodiment of my invention I do not wish to be limited to the precise details of construction shown, as changes may readily be made without departing from the spirit of my invention; but having thus described my invention I claim as new and desire to secure by Letters Patent the following:—

1. A fabric for bed springs or the like, comprising longitudinal chains consisting of long and short links arranged respectively in transverse rows, and cross chains connecting the short links of alternate longitudinal chains and extending in supporting relation under the short links of intervening longitudinal chains.

2. A fabric for bed springs or the like, comprising a plurality of spaced longitudinal chains consisting of links and rings connected alternately, and transversely disposed supports for said chains, said supports connecting the rings of alternate chains and lying beneath the rings of intervening chains.

3. A fabric for bed springs or the like, comprising longitudinal chains consisting of long and short links arranged respectively in transverse rows, and cross members connecting the short links of alternate longitudinal chains and extending in supporting relation under the short links of intervening longitudinal chains.

In witness whereof, I have hereunto subscribed my name this 10th day of October A. D. 1919.

HENRY J. WILLEMS.